Figure 7:
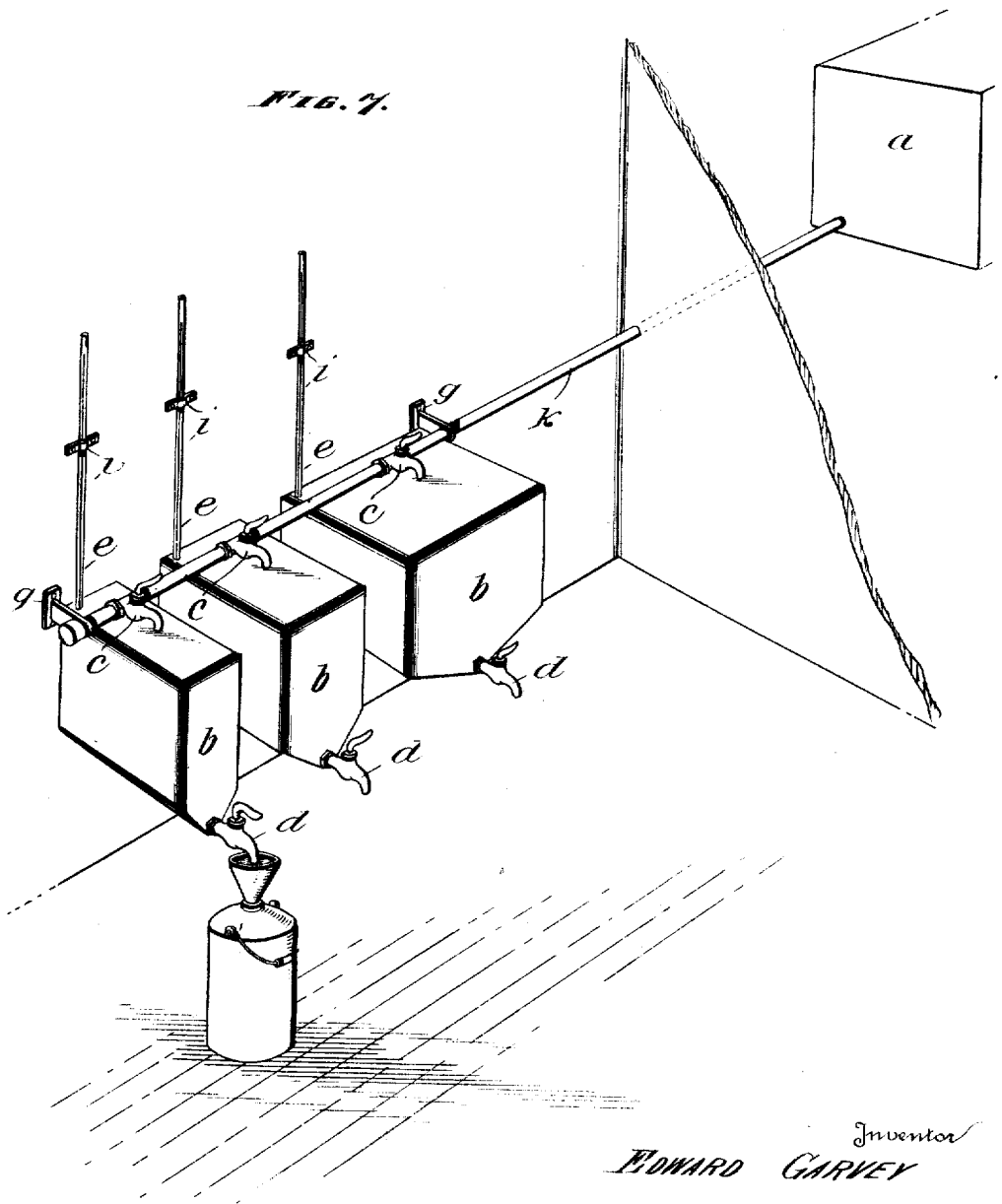

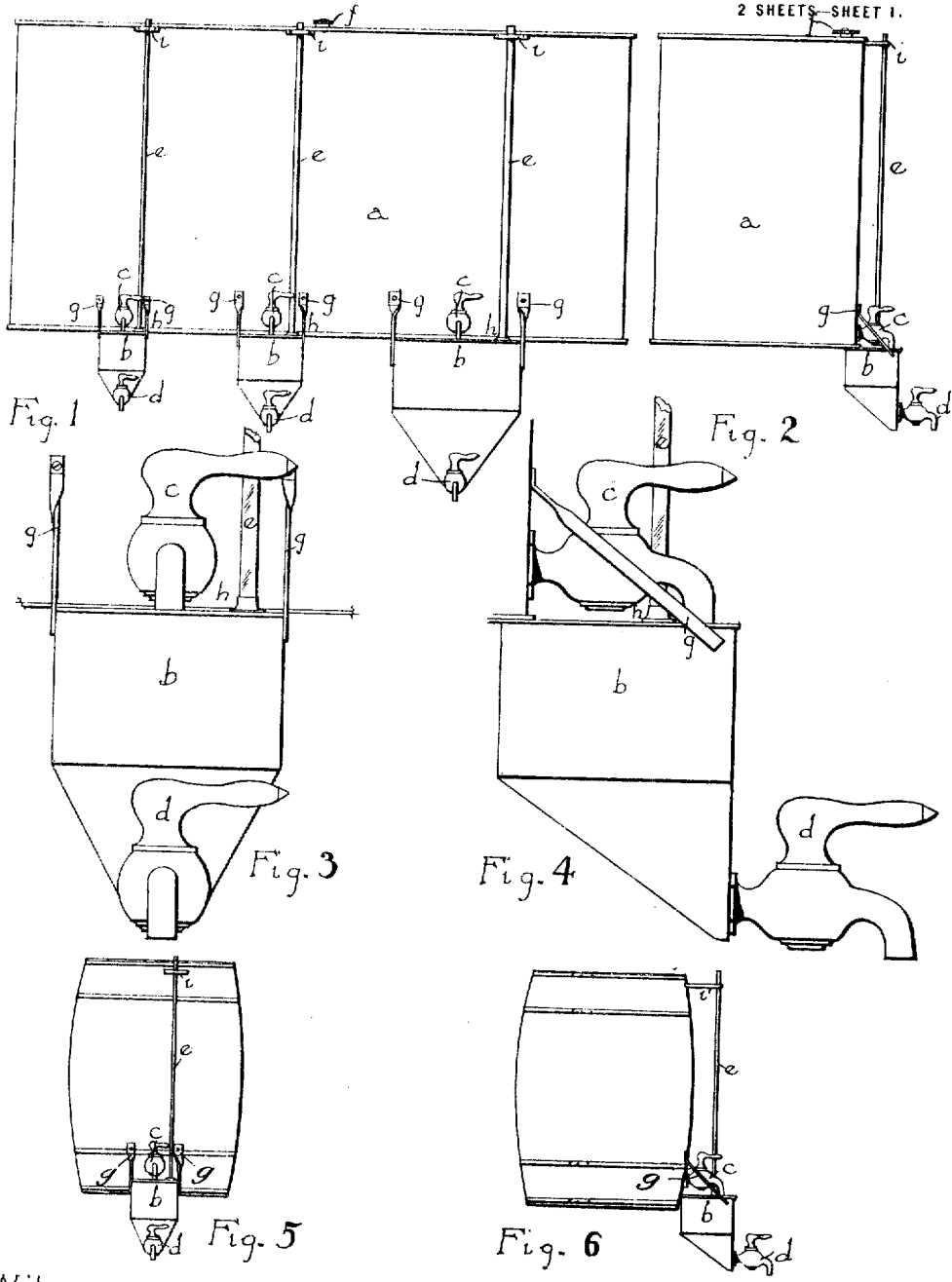

E. GARVEY.
LIQUID MEASURING APPARATUS.
APPLICATION FILED AUG. 24, 1914.

1,211,430.

Patented Jan. 9, 1917.
2 SHEETS—SHEET 2.

Inventor
EDWARD GARVEY

By Max A. Schmidt
Attorney

UNITED STATES PATENT OFFICE.

EDWARD GARVEY, OF FARMINGTON, MINNESOTA.

LIQUID-MEASURING APPARATUS.

1,211,430.  Specification of Letters Patent.  Patented Jan. 9, 1917.

Application filed August 24, 1914. Serial No. 858,254.

*To all whom it may concern:*

Be it known that I, EDWARD GARVEY, a citizen of the United States, residing at Farmington, in the county of Dakota and State of Minnesota, have invented a new and useful Improvement in Liquid-Measuring Apparatus, of which the following is a specification.

My invention relates to improvements in liquid measuring apparatus of that type consisting of a series of measuring vessels having a valved inlet connection with a liquid reservoir, and a valved outlet.

The objects of the invention are to provide an accurate, simpler and more economical measuring apparatus for merchants selling oil, vinegar, or any other liquid in measurable quantities, and to eliminate the waste and the handling of dirty measures, common in drawing quantities of liquid from reservoirs into a detached and unattachable measure, by reason of unsteady manipulation, inaccuracy of the measure, or by over drawing. I attain these objects by the apparatus illustrated in the accompanying drawings, in which—

Figure 1 is a front elevation of the invention; Fig. 2 is a side elevation thereof; Fig. 3 is a front elevation of one of the measuring vessels; Fig. 4 is a side elevation of said vessel; Figs. 5 and 6 are front and side elevations showing a slight modification, and Fig. 7 is a perspective view showing another modification.

The liquid reservoir shown at $a$ may be a tank, can, barrel, cabinet, or the like, of any kind suitable for containing, retaining and preserving liquids.

The liquid measuring vessels $b$ have different capacities, and they are air-tight and may be square, round or any other shape or form, tapering from the center to the bottom at the front, and they may be of tin, aluminum, galvanized iron or any other metal, or of glass or wood, or fiber, whichever will best retain and preserve the kind of liquid for which it is used. Each measuring vessel $b$ has a valved inlet connection with the reservoir, and a valved outlet, said inlet being a faucet $c$, and the outlet a faucet $d$. The faucets $c$ and $d$ may be of the shape, style and material of the ordinary faucets on the market.

The top of the reservoir $a$ has a filling hole closed by a cap, spigot, or plug $f$, of shape, style and material of the ordinary kind on the market.

The measuring vessels $b$ are fastened to the reservoir $a$ by suitable braces $g$.

To the top of each measuring vessel $b$ is connected a transparent tube $e$ which rises to the height of the reservoir and serves as a combined gage tube and vent. This tube is held at the top by a brace $i$ carried by the reservoir, and at the bottom by a sleeve $h$ on the vessel.

The measuring vessels $b$ are attached to the front base of the liquid reservoir $a$, at practical distances, by means of the supports or braces $g$ connected to the vessels by soldering, rivets, screws, or the like, at the front of the sides and near the top of the vessels $b$, and connected in like manner in diagonally upward positions to the reservoir.

The delivery faucets or valves $c$ connecting the measuring vessels $b$ to the reservoir $a$ are fitted air-tight into and affixed to an opening in the top and near the front of the vessels and serve to convey the liquid from the reservoir to the vessels in such quantity as the latter will hold. The outlet faucets or valves $d$ of the measuring vessels $b$ are attached at the front and the forward tapering base of the vessels in the same manner as faucets are ordinarily attached to liquid depositories; and through these faucets the liquid is discharged from the vessels $b$ in the exact quantity that they contain.

The length, aperture and dimensions of the automatic air vent tube $e$ depend upon the size of the vessels $b$ and the air pressure needed to fill the same from the reservoir $a$, and to fully discharge the contents of the vessel through delivery faucet $d$.

Figs. 5 and 6 show a reservoir $a$ in the form of an ordinary barrel, and provided with a single measuring vessel $b$.

As shown in Fig. 7, the apparatus is equally practical and attachable where it is desired to have the liquid reservoir $a$ outside the building and the measuring vessels $b$ inside the building. In that case, instead of connecting the faucet $c$ directly to the reservoir $a$, a pipe $k$ attached to the reservoir in the same place and manner as said faucet is attached, is brought through the wall of the building to a convenient point inside the building, and the measuring vessels $b$ are attached to the delivery faucet $c$ at the end of the pipe inside the building in the same manner as they are attached to the reservoir *a*, except that the supports or braces *g* and the automatic air vent tube *e* are attached to the wall instead of the reservoir *a*.

In each embodiment of the invention the liquid in the reservoir *a* is delivered through faucet *c* into the measuring vessels *b*, upon opening said faucet, the delivery faucets *d* being, of course, kept closed. When the vessels *b* have been filled to their capacity, and the liquid is to be drawn therefrom, the faucets *c* are closed and the delivery faucets *d* are opened. After a full discharge of the liquid in the vessels *b*, the faucets *d* are again closed and faucets *c* are opened to refill the vessels. In this manner the vessels *b* will always be filled and ready to be drawn in accurate standard quantities. Any one or all of the measuring vessels will be emptied according to the quantity of liquid to be dispensed.

As the tubes *e* are transparent and rise to the top of the reservoir *a*, they not only indicate whether the measuring vessels *b* are completely filled, but they also show the height of the liquid level in the reservoir. The tubes are very small in diameter, and the quantity of liquid they contain is negligible and does not affect the accuracy of the measure.

I claim:

A liquid measuring apparatus comprising a reservoir, a measuring vessel mounted outside the reservoir, said vessel having a valved inlet connection at the top with the bottom of the reservoir and a valved bottom outlet, and a transparent combined gage tube and vent connected to the top of the measuring vessel and rising therefrom to the height of the top of the reservoir, the volume of the tube relative to the volume of the measuring vessel being inappreciable.

EDWARD GARVEY.

Witnesses:
J. R. DOWLAN,
ANNA MICKO.

Copies of this patent may be obtained for five cents each, by addressing the "Commissioner of Patents, Washington, D. C."